United States Patent [19]
Pfister et al.

[11] 3,835,158
[45] Sept. 10, 1974

[54] HETEROCYCLIC SUBSTITUTED XANTHONE CARBOXYLIC ACID COMPOUNDS

[75] Inventors: Jurg R. Pfister, Los Altos; Ian T. Harrison; John H. Fried, both of Palo Alto, all of Calif.

[73] Assignee: Syntex (U.S.A.) Inc., Palo Alto, Calif.

[22] Filed: May 17, 1972

[21] Appl. No.: 254,233

[52] U.S. Cl. 260/332.2 A, 260/327 TH, 260/332.1, 260/335, 260/347.8, 424/275, 424/279, 424/283
[51] Int. Cl............................................ C07d 63/12
[58] Field of Search.......... 260/332.2 A, 335, 332.1, 260/327 TH, 328

[56] References Cited
UNITED STATES PATENTS 3,518,272   6/1970   Strandtmann et al. ............. 260/286

Primary Examiner—John D. Randolph
Assistant Examiner—C. M. S. Jaisle
Attorney, Agent, or Firm—walter H. Dreger; Gerard A. Blaufarb; William B. Walker

[57] ABSTRACT

Compounds containing and methods employing, as the essential ingredient, heterocyclic substituted xanthone carboxylic acid compounds which are useful in the treatment of allergic conditions. Methods for preparing these compounds and compositions and intermediates therein are also disclosed. 7-(2-Tetrahydrofuryl)-xanthone-2-carboxylic acid is illustrated as representative of the class.

19 Claims, No Drawings

HETEROCYCLIC SUBSTITUTED XANTHONE CARBOXYLIC ACID COMPOUNDS

The present invention is directed to novel heterocyclic substituted xanthone carboxylic acid compounds and to compositions containing and methods utilizing these compounds as the essential ingredient in the treatment of symptoms associated with allergic manifestations, for example, asthmatic conditions.

In a first aspect, the present invention relates to heterocyclic substituted xanthone carboxylic acid compounds selected from those represented by the following formulas:

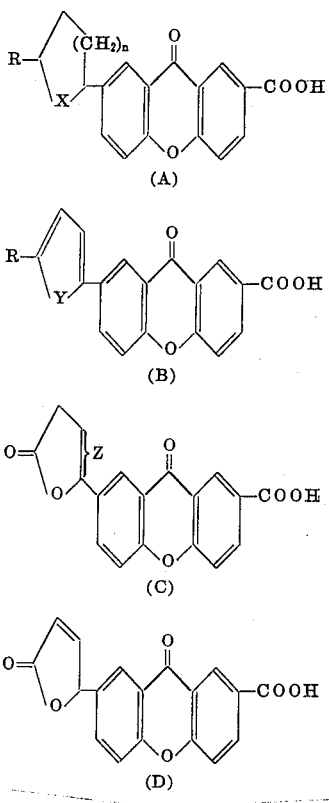

and the pharmaceutically acceptable, non-toxic esters, amides and salts thereof, wherein each R is hydrogen or lower alkyl; X is oxy, thio, sulfinyl, or sulfonyl; $n$ is 1 or 2; Y is oxy or thio; and Z is a carbon-carbon single or double bond.

Thus included within the scope of the present invention are the C-7 substituted xanthone-2-carboxylic acid compounds and the pharmaceutically acceptable, non-toxic esters, amides and salts thereof, wherein the substituent is selected from 2-tetrahydrofuryl, 2-tetrahydrothienyl, 1-oxo-2-tetrahydrothienyl, 1,1-dioxo-2-tetrahydrothienyl, 2-tetrahydropyranyl, 2-tetrahydrothiopyranyl, 1-oxo-2-tetrahydrothiopyranyl, and 1,1-dioxo-2-tetrahydrothiopyranyl of Formula (A) above, and from 2-furyl and 2-thienyl of Formula (B) above, and from 5-oxo-2-tetrahydrofuryl and 5-oxo-4H-2-furyl of Formula (C) above, and from 5-oxo-2H-2-furyl of Formula (D) above and the appropriate lower alkyl (R) substituted derivatives thereof.

In a second aspect, the present invention is directed to a method useful for relieving symptoms associated with allergic manifestations such as are brought about by antigen-antibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic productions, e.g. histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

This aspect of the present invention thus relates to a method useful for inhibiting the effects of the allergic reaction which comprises administering an effective amount of a compound selected from those represented above (A, B, C, and D) and the pharmaceutically acceptable non-toxic esters, amides, and salts thereof; or a pharmaceutically acceptable non-toxic composition incorporating said acids, esters, amides or salts as an essential ingredient.

The present invention, in a third aspect, is directed to pharmaceutical compositions useful for inhibiting the effects of the allergic reaction comprising an effective amount of a compound selected from those represented above (A, B, C and D) and the pharmaceutically acceptable esters, amides, and salts thereof; in admixture with a pharmaceutically acceptable non-toxic carrier.

The compounds of the present invention are also smooth muscle relaxants, e.g. bronchial dilators, and are therefore useful in the treatment of conditions in which such agents may be indicated, as for instance, in the treatment of broncho-constriction. The compounds of the present invention are also vasodilators and are therefore useful in the treatment of conditions in which such agents may be indicated, as for instance, in renal and cardiac disorders.

In the practice of the method of the present invention, an effective amount of a compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered topically, parenterally, by inhalation, and preferably orally, in the form of either solid, liquid, or gaseous dosages including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or, perhaps, imminent; however, the method hereof is also usefully practiced as continuous or prophylactic treatment.

In view of the foregoing as well as in consideration of the degree of severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7,000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., Immunology, 16, 749 (1969).

Certain of the compounds of the present invention can be prepared in accordance with the following reaction sequence:

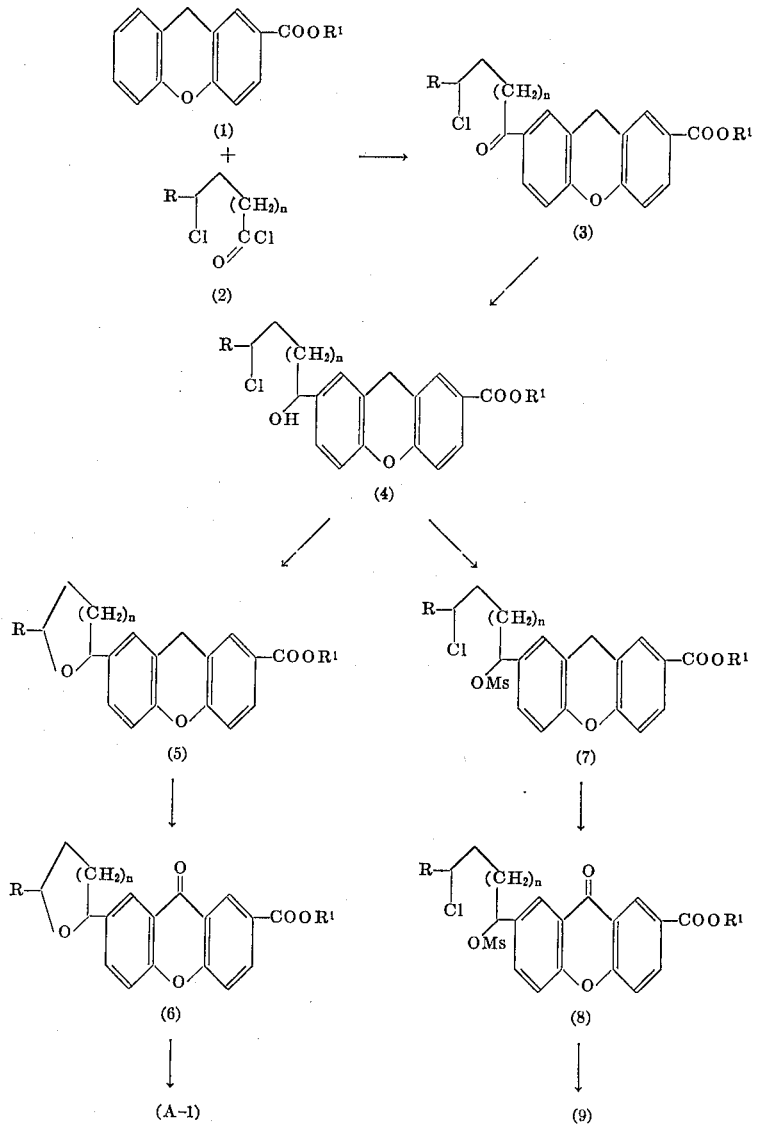

Sequence A

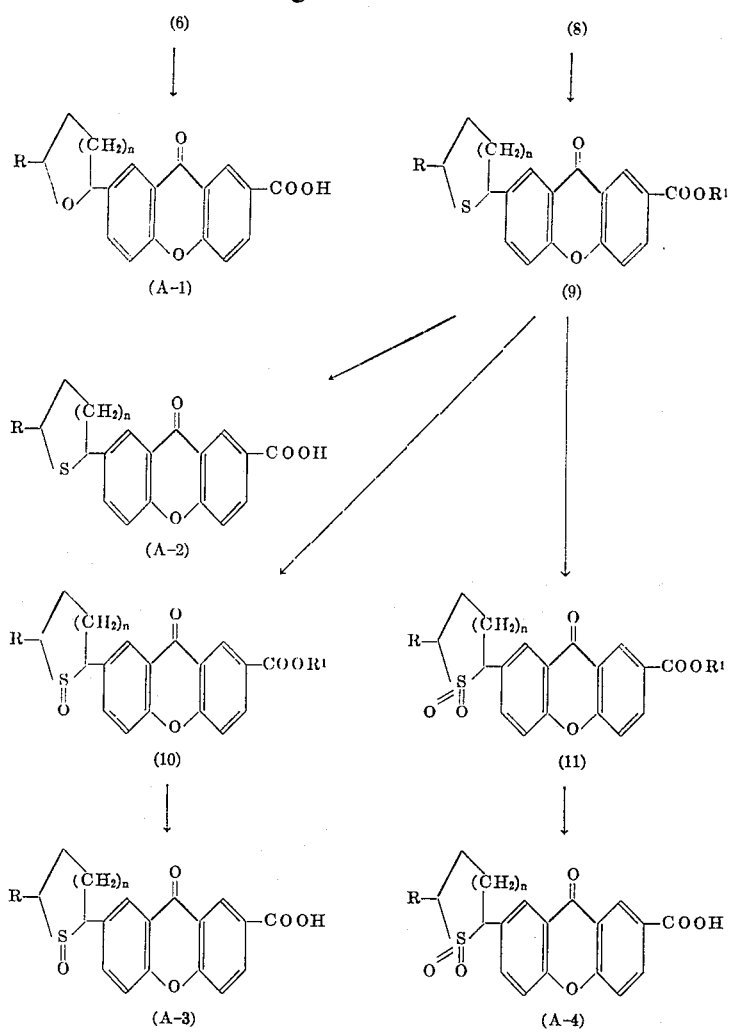

wherein each of R and n is as above defined, R[1] is lower alkyl, preferably methyl, and Ms is mesyl (methylsulfonyl).

With reference to the above reaction sequence, a xanthene-2-carboxylate (1) is reacted with a 4-chlorobutyryl chloride or a 5-chloropentanoyl chloride (2) and aluminum chloride under known Friedel-Crafts reaction conditions to give the corresponding 7-acylxanthene-2-carboxylate (3). The carbonyl group of the acyl group is then reduced under conventional conditions, such as with sodium borohydride, to give the corresponding chlorohydrin compound (4). The latter is cyclized, such as with an alkali metal hydride, in organic solvent to afford the 7-(2-tetrahydrofuryl)- or 7-(2-tetrahydropyranyl)-xanthene-2-carboxylate compound (5). The latter compound is conventionally oxidized, such as with Collins reagent, to give the corresponding xanthone compound (6) which is conventionally base hydrolyzed to give the product acids hereof (A-1).

Alternatively, the chlorohydrin (4) is converted to the corresponding mesyl compound (7) by treatment with methylsulfonyl chloride in base under known conditions. The mesyl xanthene compound (7) is then oxidized, as described above, to give the corresponding xanthone compound (8). The latter is cyclized, such as with an alkali metal hydrosulfide in organic solvent, to afford the 7-(2-tetrahydrothienyl)- or 7-(2-tetrahydrothiopyranyl)-xanthone-2-carboxylate (9) which is base hydrolyzed to give the product acids hereof (A-2).

The compounds (9) can also be oxidized to give the 1-oxo and 1,1-dioxo compounds (10) and (11) and these hydrolyzed to the product acids hereof (A3) and (A-4), respectively. Conducting said oxidation with a peracid, such as peracetic acid, m-chloroperbenzoic acid, p-nitroperbenzoic acid, perphthalic acid, and so forth, give the 1-oxo compounds (10) which can be hydrolyzed, as above described. Conducting said oxidation with excess hydrogen peroxide gives compounds (11) which can be hydrolyzed as above described.

In said oxidation steps, and particularly that employing peracid, a mixture of products (10) and (11) may be obtained. If obtained, the mixture can be conventionally separated, such as via chromatography, if desired, to isolate the oxidized products.

Certain of the compounds of the present invention can be prepared in accordance with the following reaction sequence:

Sequence B

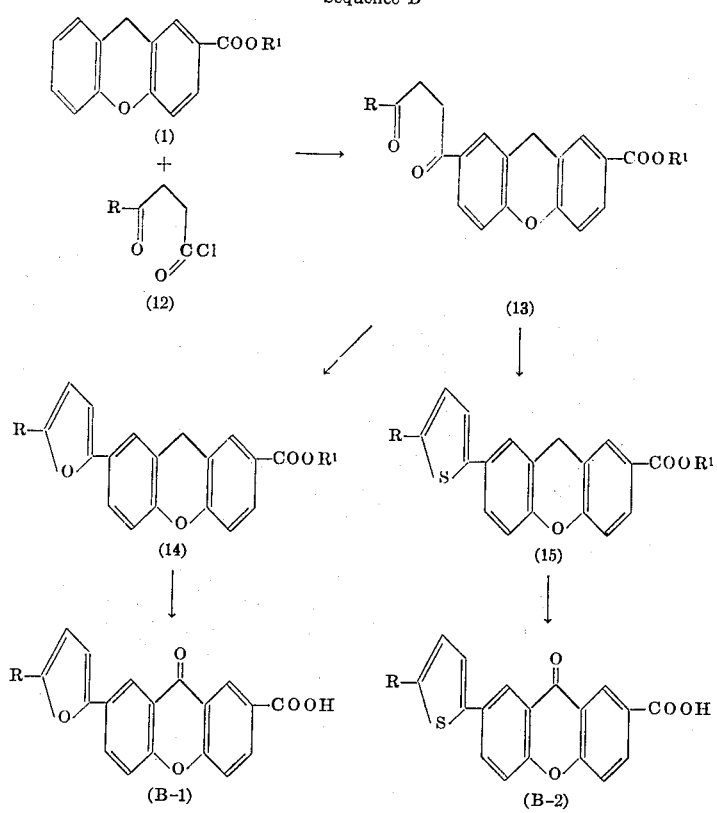

wherein each of R and $R^1$ is as above defined.

With reference to the above reaction sequence, a xanthene-2-carboxylate (1) is reacted with the butyryl chloride ketone or aldehyde (12) and aluminum chloride under known Friedel-Crafts conditions to give the corresponding adduct (13). This compound can be cyclized by treatment with acid, e.g. hydrogen chloride in acetic acid, to give the 2-furyl compound (14) which can be oxidized followed by hydrolysis, as described above, to give the acid products hereof (B-1). Cyclization of (13) with phosphorus pentasulfide in, e.g. benzene or pyridine, to give the 2-thienyl compound (15) which can be oxidized followed by hydrolysis, as described above, to give the acid products hereof (B-2).

Alternatively, certain of the compounds hereof can be prepared as follows:

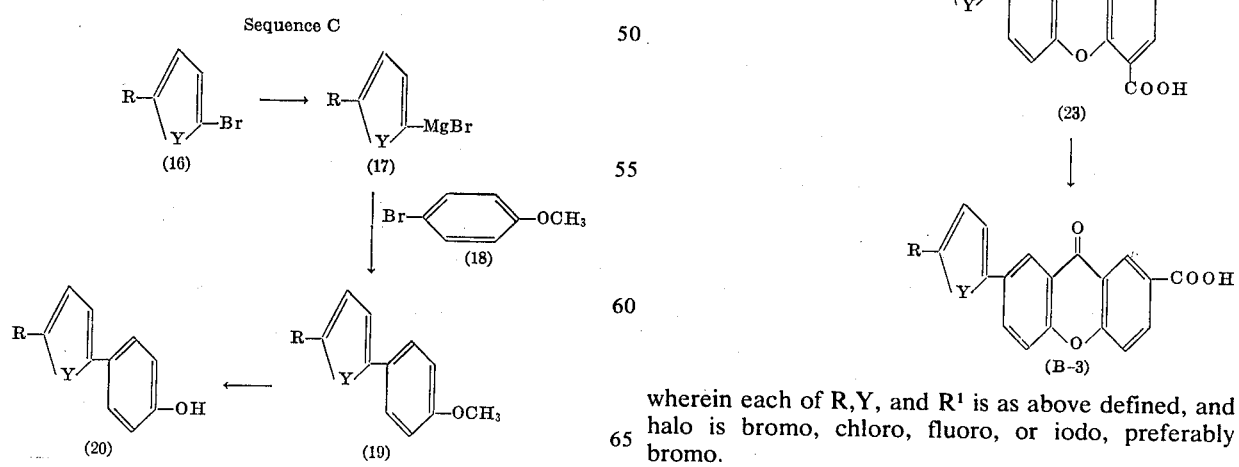

wherein each of R, Y, and $R^1$ is as above defined, and halo is bromo, chloro, fluoro, or iodo, preferably bromo.

With reference to the above reaction sequence, the Grignard reagent (17) is prepared via methods known per se from (16). The Grignard reagent is then reacted with p-bromoanisole (18) in tetrahydrofuran, for example, to give the adduct (19) which is demethylated with pyridine hydrochloride to give the p-hetero substituted phenol (20). The thus prepared phenol (20) is condensed with the 4-halo-1,3-dicarboalkoxybenzene (21) in the presence of cuprous oxide optionally in organic liquid reaction medium, preferably an organic amide, such as dimethyl acetamide, dimethyl formamide, N-methylpyrrolidone, tetramethylurea, and so forth, to prepare the corresponding diphenyl ether derivative (22).

The reaction is preferably conducted in an inert organic reaction medium, such as those listed above, or suitable mixtures of one or more of such media. The reaction is further conducted at temperatures ranging from about 80° to about 220° C, preferably from about 120° to 200° C, and for a period of time sufficient to complete the reaction, ranging from about 2 hours to about 24 hours.

The reaction consumes the reactants on the basis of one mole of compound (20) per mole of compound (21) per half mole of cuprous oxide. However, the amounts of the reactants to be employed are not critical, some of the desired compound (22) product being obtained when employing any proportions thereof. In the preferred embodiments, the reaction is conducted by reacting from about 1 to about 3 moles of the compound (21) with about from 1 to about 1.2 moles of compound (20) in the presence of from about 0.5 to about 0.6 moles of the cuprous oxide. The inert organic reaction medium, if employed, is used in solvent amounts.

Thereafter, the prepared compound (22) is base hydrolyzed, as described above, to give the corresponding dicarboxylic acid (23).

The thus prepared diacid compound (23) is then cyclized with phosphoryl chloride, thionyl chloride, sulfuric acid, hydrogen fluoride or, preferably, polyphosphoric acid (PPA), to give the corresponding 7-substituted xanthone-2-carboxylic acid compound ( B-3). The reaction is preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180° C, and for a period of time sufficient to complete the reaction ranging from about 15 minutes to about 90 minutes.

Although the reaction consumes the reactants on the basis of one mole of compound (23 ) per mole of cyclizing reagent, the reaction can be performed using any proportions of reactants. In the preferred embodiments, however, the reaction is conducted using from about 20 to about 50 moles of the cyclizing reagent per mole of starting compound (23).

Certain of the compounds of the present invention can be prepared in accordance with the following reaction sequence:

Sequence D

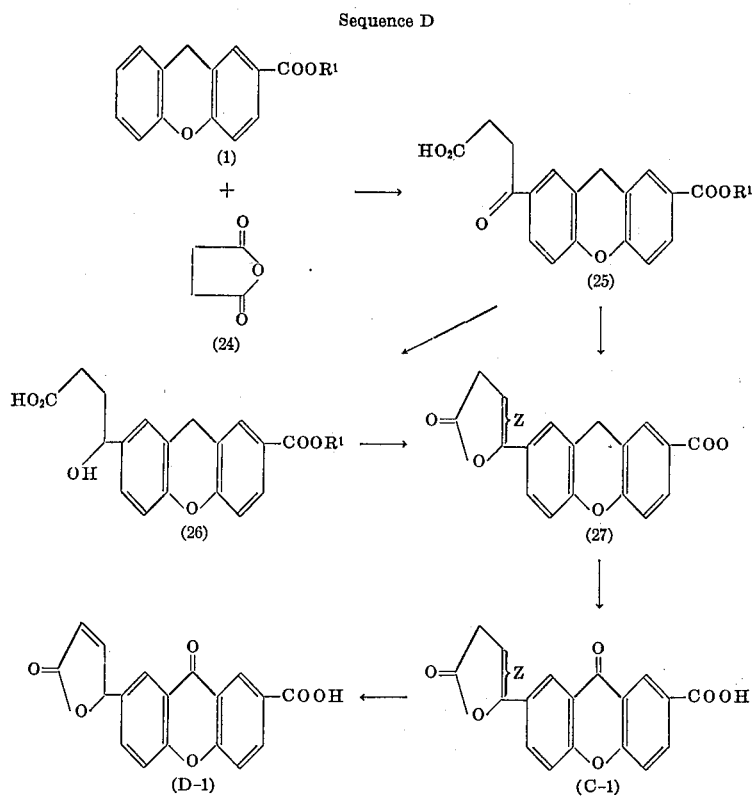

wherein each of R¹ and Z is as above defined.

With reference to the above reaction sequence, a xanthene-2-carboxylate (1) is treated with succinic anhydride (24) to give the corresponding 7-acylxanthene-2-carboxylate (25). This compound can be reduced to the alcohol (26), as described above, such as with sodium borohydride and this when treated with acid gives the xanthene saturated lactone (27, Z=single bond). Similar treatment of the acyl compound (25) with acid affords the xanthene unsaturated lactone (27, Z=double bond). The thus produced compound (27) can be oxidized followed by hydrolysis, as described above, to give the 7-lactone-xanthone-2-carboxylic acid products hereof (C-1). This compound (Z=double bond) can be isomerized with base to give the isomeric 7-lactone-xanthone-2-carboxylic acid products hereof (D-1).

The acid esters of the xanthone-2-carboxylic acids hereof are prepared upon treatment of the acid with ethereal diazoalkane, such as diazomethane and diazoethane, or with the desired lower alkyl iodide in the presence of lithium carbonate at room temperature or with the desired lower alkanol in the presence of a trace of sulfuric acid at reflux. The glycerol esters are prepared by treating the acid with thionyl chloride followed by treatment with a suitably protected ethylene glycol or propylene glycol (e.g. solketal) in pyridine, and hydrolyzing the protecting group of the ester thus formed with dilute acid.

The amides of the xanthone-2-carboxylic acids hereof are prepared by treatment of the acids with thionyl chloride followed by treatment with anhydrous ammonia, alkyl amine, dialkyl amine, dialkylaminoalkylamine, alkoxyalkylamine, or phenethylamine.

The salts of the xanthone-2-carboxylic acids hereof are prepared by treating the corresponding acids with pharmaceutically acceptable base. Representative salts derived from such pharmaceutically acceptable bases are sodium, potassium, lithium, ammonia, calcium, magnesium, ferrous, ferric, zinc, manganous, aluminum, manganic, the salts of trimethylamine, triethylamine, tripropylamine, β-(dimethylamino)ethanol, triethanolamine, β-(diethylamino)ethanol, arginine, lysine, histidine, N-ethylpiperidine, hydrabamine, choline, betaine, ethylenediamine, glucosamine, methyl glucamine, theobromine, purines, piperazine, piperidine, polyamine resins, caffeine, procaine, or the like. The reaction is conducted in an aqueous solution, alone or in combination with an inert, water miscible organic solvent, at a temperature of from about 0° C to about 100° C, preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids the free acid starting material is treated with about one-half molar equivalent of pharmaceutically acceptable base. When the aluminum salts of the acids are prepared, about one-third molar equivalent of the pharmaceutically acceptable base are employed.

In the preferred embodiment of the present invention, the calcium salts and magnesium salts of the acids are prepared by treating the corresponding sodium or potassium salts of the acids with at least one molar equivalent of calcium chloride or magnesium chloride, respectively, in an aqueous solution, alone or in combination with an inert water miscible organic solvent, at a temperature of from about 20° C to about 100° C.

In the preferred embodiment of the present invention, the aluminum salts of the acids are prepared by treating the acids with at least one molar equivalent of an aluminum alkoxide, such as aluminum triethoxide, aluminum tripropoxide and the like, in a hydrocarbon solvent, such as benzene, xylene, cyclohexane, and the like, at a temperature of from about 20° C to about 115° C.

In the present specification and claims, by the term "lower alkyl" is intended a lower alkyl group containing one to five carbon atoms including straight and branched chain groups, for example, methyl, ethyl, n-propyl, isopropyl, n-butyl, isobutyl, sec-butyl, t-butyl, n-pentyl, isopentyl, sec-pentyl, and t-pentyl.

By the term "pharmaceutically acceptable, non-toxic esters, amides, and salts" is respectively intended an alkyl or glycerol ester; an unsubstituted, monoalkyl, dialkyl, dialkylaminoalkyl, alkoxyalkyl, or phenethyl substituted amide and a salt as defined above.

The starting compounds for use in the present invention are known and can be prepared as follows. The xanthene-2-carboxylates can, if desired, be prepared by the reduction of xanthone-2-carboxylic acid followed by esterification. The acid chloride acylating agents are prepared from the parent acids, the latter being prepared by reacting 3-carbomethoxypropionyl chloride with the requisite dialkyl cadmium compound followed by saponification of the ester group. Prior to saponification, the keto esters can be reduced with sodium borohydride to give the alcohol and this treated with triphenylphosphine/CCl₄ to give the chloro compound which is saponified and treated with thionyl chloride to give the 4-chlorobutyryl and -pentanoyl chlorides. The 2-bromofuran and 2-bromothiophene compounds are prepared by bromination of the corresponding alkylfurans and -thiophenes. The 1,3-dicarbalkoxy-4-halobenzene starting compounds are conveniently prepared by oxidizing 1,3-dimethyl-4-halobenzene (4-halo-m-xylene) with potassium permanganate in aqueous t-butanol followed by conventional esterification.

The nomenclature herein is employed in accordance with Chemical Abstracts, 56, Subject Index (1962, January – June).

The following examples illustrate the method by which the present invention can be practiced.

EXAMPLE 1

1. A mixture of 5 grams of methyl xanthene-2-carboxylate, 6.5 g. of aluminum chloride, 3.5 g. of 4-chlorobutyryl chloride, and 100 ml. of 1,2-dichloroethane is stirred at room temperature for 4 hours. After this time, the reaction mixture is added to ice/HCl and extracted with methylene chloride. The extracts are evaporated and the residue triturated with cold methanol to give methyl 7-(4-chlorobutyryl)xanthene-2-carboxylate.

2. A mixture of 3.5 g. of methyl 7-(4-chloro butyryl)-xanthene-2-carboxylate, 500 mg. of sodium borohydride, 75 ml. of tetrahydrofuran and 25 ml. of isopropanol is stirred at room temperature for 6 hours. The reaction mixture is monitored by tlc. After this time, 200 ml. of 5 percent aqueous acetic acid is added and the mixture is extracted with ethyl acetate and the extracts evaporated to give methyl 7-(1-hydroxy-4-chloro-n-butyl)-xanthene-2-carboxylate.

3. The above procedures are repeated using methyl xanthene-2-carboxylate and the compounds listed under Column A below (for the procedure of Paragraph 1 above) to give, after reduction, as described in Paragraph 2 above, the products listed under Column B below.

| Column A | Column B |
| --- | --- |
| 5-chloropentanoyl chloride | methyl 7-(1-hydroxy-5-chloro-n-pentyl)-xanthene-2-carboxylate |
| 4-chloropentanoyl chloride | methyl 7-(1-hydroxy-4-chloro-n-pentyl)-xanthene-2-carboxylate |
| 5-chlorohexanoyl chloride | methyl 7-(1-hydroxy-5-chloro-n-hexyl)-xanthene-2-carboxylate |
| 4-chlorohexanoyl chloride | methyl 7-(1-hydroxy-4-chloro-n-hexyl)-xanthene-2-carboxylate |
| 5-chloroheptanoyl chloride | methyl 7-(1-hydroxy-5-chloro-n-heptyl)-xanthene-2-carboxylate |
| 4-chloroheptanoyl chloride | methyl 7-(1-hydroxy-4-chloro-n-heptyl)-xanthene-2-carboxylate |
| 5-chlorooctanoyl chloride | methyl 7-(1-hydroxy-5-chloro-n-octyl)-xanthene-2-carboxylate |
| 4-chloro-5-methyl-hexanoyl chloride | methyl 7-(1-hydroxy-4-chloro-5-methyl-n-hexyl)-xanthene-2-carboxylate |
| 5-chloro-6-methylheptanoyl chloride | methyl 7-(1-hydroxy-5-chloro-6-methyl-n-heptyl)-xanthene-2-carboxylate |
| 4-chlorooctanoyl chloride | methyl 7-(1-hydroxy-4-chloro-n-octyl)-xanthene-2-carboxylate |
| 5-chlorononoyl chloride | methyl 7-(1-hydroxy-5-chloro-n-nonyl)-xanthene-2-carboxylate |
| 4-chloro-6-methylheptanoyl chloride | methyl 7-(1-hydroxy-4-chloro-6-methyl-n-heptyl)-xanthene-2-carboxylate |
| 5-chloro-7-methyloctanoyl chloride | methyl 7-(1-hydroxy-5-chloro-7-methyl-n-octyl)-xanthene-2-carboxylate |
| 4-chloro-5-methylheptanoyl chloride | methyl 7-(1-hydroxy-4-chloro-5-methyl-n-heptyl)-xanthene-2-carboxylate |
| 5-chloro-6-methyloctanoyl chloride | methyl 7-(1-hydroxy-5-chloro-6-methyl-n-octyl)-xanthene-2-carboxylate |
| 4-chloro-5,5-dimethyl-hexanoyl chloride | methyl 7-(1-hydroxy-4-chloro-5,5-dimethyl-n-hexyl)-xanthene-2-carboxylate |
| 5-chloro-6,6-dimethyl-heptanoyl chloride | methyl 7-(1-hydroxy-5-chloro-6,6-dimethyl-n-heptyl)-xanthene-2-carboxylate |
| 4-chlorononoyl chloride | methyl 7-(1-hydroxy-4-chloro-n-nonyl)-xanthene-2-carboxylate, and |
| 5-chlorodecanoyl chloride | methyl 7-(1-hydroxy-5-chloro-n-decyl)-xanthene-2-carboxylate. |

In like manner, the foregoing can be practiced using other lower alkyl xanthene-2-carboxylate starting compounds, e.g. ethyl xanthene-2-carboxylate.

EXAMPLE 2

1. A mixture of 3.5 grams of methyl 7-(1-hydroxy-4-chloro-*n*-butyl)-xanthene-2-carboxylate, 1.2 g. of sodium hydride, and 70 ml. of dimethylformamide is stirred at 75° C for 12 hours under nitrogen. The reaction is monitored by tlc. The reaction mixture is acidified, extracted with ethyl acetate and chromatographed on silica ($CH_2Cl_2$) to give methyl 7-(2-tetrahydrofuryl)-xanthene-2-carboxylate.

2. Methyl 7-(2-tetrahydrofuryl)-xanthene-2-carboxylate (3.6 g.) is oxidized at room temperature with Collins reagent (prepared in situ from 8 g. of chromic oxide and 15 ml. of pyridine in 250 ml. of methylene chloride) with stirring for 1.5 hours. The reaction mixture is filtered through alumina and crystallized from acetone:hexane to give methyl 7-(2-tetrahydrofuryl)-xanthone-2-carboxylate.

3. Methyl 7-(2-tetrahydrofuryl)-xanthone-2-carboxylate (1.5 g.), 75 ml. of ethanol, and 15 ml. of 2N sodium hydroxide is refluxed for 30 minutes, filtered and acidified. The product is isolated by suction filtration and washed neutral (ethanol:water) to give 7-(2-tetrahydrofuryl)-xanthone-2-carboxylic acid.

4. The above procedures are repeated using the products of Column B of Paragraph 3 of Example 1 to give, after cyclization, oxidation, and hydrolysis as described above in Paragraphs 1 to 3, the following respective products:

7-(2-tetrahydropyranyl)-xanthone-2-carboxylic acid, 7-(5-methyl-2-tetrahydrofuryl)-xanthone-2-carboxylic acid, 7-(6-methyl-2-tetrahydropyranyl)-xanthone-2-carboxylic acid, 7-(5-ethyl-2-tetrahydrofuryl)-xanthone-2-carboxylic acid, 7-(6-ethyl-2-tetrahydropyranyl)-xanthone-2-carboxylic acid, 7-(5-*n*-propyl-2-tetrahydrofuryl)-xanthone-2-carboxylic acid, 7-(6-*n*-propyl-2-tetrahydropyranyl)-xanthone-2-carboxylic acid, 7-(5-isopropyl-2-tetrahydrofuryl)-xanthone-2-carboxylic acid, 7-(6-isopropyl-2-tetrahydropyranyl)-xanthone-2-carboxylic acid, 7-(5-*n*-butyl-2-tetrahydrofuryl)-xanthone-2-carboxylic acid, 7-(6-*n*-butyl-2-tetrahydropyranyl)-xanthone-2-carboxylic acid, 7-(5-isobutyl-2-tetrahydrofuryl)-xanthone-2-carboxylic acid, 7-(6-isobutyl-2-tetrahydropyranyl)-xanthone-2-carboxylic acid, 7-(5-sec-butyl-2-tetrahydrofuryl)-xanthone-2-carboxylic acid, 7-(6-sec-butyl-2-tetrahydropyranyl)-xanthone-2-carboxylic acid, 7-(5-*t*-butyl-2-tetrahydrofuryl)-xanthone-2-carboxylic acid, 7-(6-*t*-butyl-2-tetrahydropyranyl)-xanthone-2-carboxylic acid, 7-(5-*n*-pentyl-2-tetrahydrofuryl)-xanthone-2-carboxylic acid, and 7-(6-*n*-pentyl-2-tetrahydropyranyl)-xanthone-2-carboxylic acid.

EXAMPLE 3

1. To a mixture of 4.6 grams of methyl 7-(1-hydroxy-4-chloro-*n*-butyl)-xanthene-2-carboxylate, 3.5 ml. of triethylamine, and 125 ml. of methylene chloride maintained at 0° C, are added 1.2 ml. of methyl sulfonyl chloride in 15 ml. of methylene chloride dropwise and with stirring over a 15 minute period. The reaction mixture is stirred overnight at room temperature. The reaction mixture is diluted with methylene chloride, washed with water and the extracts are evaporated to give methyl 7-(1-methylsulfonyloxy-4-chloron-butyl)-xanthene-2-carboxylate.

2. A mixture of 5.0 g. of methyl 7-(1-methylsulfonyloxy-4-chloro-*n*-butyl)-xanthene-2-carboxylate in 25 ml. of methylene chloride is added to a solution of Collins reagent (prepared in situ from 10.0 g. of chromic acid and 16 ml. of pyridine in 250 ml. of methylene chloride) and the resultant mixture is stirred at 0° C for 2 hours and then at room temperature for 16 hours. The reaction mixture is then filtered through alumina and the solvent evaporated to give methyl 7-(1-methylsulfonyloxy-4-chloro-*n*-butyl)-xanthone-2-carboxylate.

3. A mixture of 4.4 g. of methyl 7-(1-methylsulfonyloxy-4-chloro-*n*-butyl)-xanthone-2-carboxylate, 800 mg. of sodium hydrosulfide, and 100 ml. of dimethylformamide is stirred for 30 minutes at 0° C. The reaction mixture is diluted with water, extracted with ether and the product recrystallized from acetone:hexane to give methyl 7-(2-tetrahydrothienyl)-xanthone-2-carboxylate.

4. A mixture of methyl 7-(2-tetrahydrothienyl)-xanthone-2-carboxylate, 10 ml. of 2N sodium hydroxide, and 90 ml. of ethanol is refluxed for 30 minutes. The reaction mixture is filtered, cooled, and acidified to give 7-(2-tetrahydrothienyl)-xanthone-2-carboxylic acid.

5. The above procedures are repeated using the products of Column B of Paragraph 3 of Example 1 to give, after mesylation, oxidation, cyclization, and hydrolysis as described above in Paragraphs 1 to 4, the following respective products:

7-(2-tetrahydrothiopyranyl)-xanthone-2-carboxylic acid, 7-(5-methyl-2-tetrahydrothienyl)-xanthone-2-carboxylic acid, 7-(6-methyl-2-tetrahydrothiopyranyl)-xanthone-2-carboxylic acid, 7-(5-ethyl-2-tetrahydrothienyl)-xanthone-2-carboxylic acid, 7-(6-ethyl-2-tetrahydrothiopyranyl)-xanthone-2-carboxylic acid, 7-(5-*n*-propyl-2-tetrahydrothienyl)-xanthone-2-carobxylic acid, 7-(6-*n*-propyl-2-tetrahydrothiopyranyl)-xanthone-2-carboxylic acid, 7-(5-isopropyl-2-tetrahydrothienyl)-xanthone-2-carboxylic acid, 7-(6-isopropyl-2-tetrahydrothiopyranyl)-xanthone-2-carboxylic acid, 7-(5-*n*-butyl-2-tetrahydrothienyl)-xanthone-2-carboxylic acid, 7-(6-*n*-butyl-2-tetrahydrothiopyranyl)-xanthone-2-carboxylic acid, 7-(5-isobutyl-2-tetrahydrothienyl)-xanthone-2-carboxylic acid, 7-(6-isobutyl-2-tetrahydrothiopyranyl)-xanthone-2-carboxylic acid, 7-(5-sec-butyl-2-tetrahydrothienyl)-xanthone-2-carboxylic acid, 7-(6-sec-butyl-2-tetrahydrothiopyranyl)-xanthone-2-carboxylic acid, 7-(5-*t*-butyl-2-tetrahydrothienyl)-xanthone-2-carboxylic acid, 7-(6-*t*-butyl-2-tetrahydrothiopyranyl)-xanthone-2-carboxylic acid, 7-(5-*n*-pentyl-2-tetrahydrothienyl)-xanthone-2-carboxylic acid, and 7-(6-*n*-pentyl-2-tetrahydrothiopyranyl)-xanthone-2-carboxylic acid.

EXAMPLE 4

1. To a mixture of 2.0 grams of methyl 7-(2-tetrahydrothienyl)-xanthone-2-carboxylate in 50 ml. of methylene chloride maintained at 0° C, is added dropwise a solution of 1.02 g. of *m*-chloroperbenzoic acid in 30 ml. of chloroform. The resultant solution is filtered through alumina ($CH_2Cl_2$) and crystallized from chloroform:ethanol to give methyl 7-(1-oxo-2-tetrahydrothienyl)-xanthone-2-carboxylate.

2. A mixture of 400 mg. of methyl 7-(1-oxo-2-tetrahydrothienyl)-xanthone-2-carboxylate, 50 ml. of ethanol, and 5 ml. of 1N sodium hydroxide is refluxed for 30 minutes. The reaction mixture is acidified and cooled to give 7-(1-oxo-2-tetrahydrothienyl)-xanthone-2-carboxylic acid.

3. The above procedures (Paragraphs 1 and 2) are repeated upon the methyl esters of the products listed in Paragraph 5 of Example 3 (prepared as described in Paragraphs 1 to 3 of Example 3) to give the following compounds:

7-(1-oxo-2-tetrahydrothiopyranyl)-xanthone-2-carboxylic acid, 7-(1-oxo-5-methyl-2-tetrahydrothienyl)-xanthone-2-carboxylic acid, 7-(1-oxo-6-methyl-2-tetrahydrothiopyranyl)-xanthone-2-carboxylic acid, 7-(1-oxo-5-ethyl-2-tetrahydrothienyl)-xanthone-2-carboxylic acid, 7-(1-oxo-6-ethyl-2-tetrahydrothiopyranyl)-xanthone-2-carboxylic acid, 7-(1-oxo-5-*n*-propyl-2-tetrahydrothienyl)-xanthone-2-carboxylic acid, 7-(1-oxo-6-*n*-propyl-2-tetrahydrothiopyranyl)-xanthone-2-carboxylic acid, 7-(1-oxo-5-isopropyl-2-tetrahydrothienyl)-xanthone-2-carboxylic acid, 7-(1-oxo-6-isopropyl-2-tetrahydrothiopyranyl)-xanthone-2-carboxylic acid, 7-(1-oxo-5-*n*-butyl-2-tetrahydrothienyl)-xanthone-2-carboxylic acid, 7-(1-oxo-6-*n*-butyl-2-tetrahydrothiopyranyl)-xanthone-2-carboxylic acid, 7-(1-oxo-5-isobutyl-2-tetrahydrothienyl)-xanthone-2-carboxylic acid, 7-(1-oxo-6-isobutyl-2-tetrahydrothiopyranyl)-xanthone-2-carboxylic acid, 7-(1-oxo-5-sec-butyl-2-tetrahydrothienyl)-xanthone-2-carboxylic acid, 7-(1-oxo-6-sec-butyl-2-tetrahydrothiopyranyl)-xanthone-2-carboxylic acid, 7-(1-oxo-5-*t*-butyl-2-tetrahydrothienyl)-xanthone-2-carboxylic acid, 7-(1-oxo-6-*t*-butyl-2-tetrahydrothiopyranyl)-xanthone-2-carboxylic acid, 7-(1-oxo-5-*n*-pentyl-2-tetrahydrothienyl)-xanthone-2-carboxylic acid, and 7-(1-oxo-6-*n*-pentyl-2-tetrahydrothiopyranyl)-xanthone-2-carboxylic acid.

EXAMPLE 5

1. To a solution of 1.8 grams of methyl 7-(2-tetrahydrothienyl)-xanthone-2-carboxylate in 120 ml. of acetic acid is added 15 ml. of 30 percent hydrogen peroxide and the resultant mixture is heated on the steam bath (80° to 90° C) for 30 minutes. The reaction mixture is diluted with 150 ml. of water and cooled to give methyl 7-(1,1-dioxo-2-tetrahydrothienyl)-xanthone-2-carboxylate.

2. The above product is hydrolyzed, as described in Paragraph 2 of Example 4, to give 7-(1,1-dioxo-2-tetrahydrothienyl)-xanthone12-carboxylic acid.

3. The above procedures (Paragraphs 1 and 2) are repeated upon the methyl esters of the products listed in Paragraph 5 of Examle 3 (prepared as described in Paragraphs 1 to 3 of Example 3) to give the following compounds:

7-(1,1-dioxo-2-tetrahydrothiopyranyl)-xanthone-2-carboxylic acid, 7-(1,1-dioxo-5-methyl-2-tetrahydrothienyl)-xanthone-2-carboxylic acid, 7-(1,1-dioxo-6-methyl-2-tetrahydrothiopyranyl)-xanthone-2-carboxylic acid, 7-(1,1-dioxo-5-ethyl-2-tetrahydrothienyl)-xanthone-2-carboxylic acid, 7-(1,1-dioxo-6-ethyl-2-tetrahydrothiopyranyl)-xanthone-2-carboxylic acid, 7-(1,1-dioxo-5-*n*-propyl-2-tetrahydrothienyl)-xanthone-2-carboxylic acid, 7-(1,1-dioxo-6-*n*-propyl-2-tetrahydrothiopyranyl)-xanthone-2-carboxylic acid, 7-(1,1-dioxo-5-isopropyl-2-tetrahydrothienyl)-xanthone-2-carboxylic acid, 7-(1,1-dioxo-6-isopropyl-2-tetrahydrothiopyranyl)-xanthone-2-carboxylic acid, 7-(1,1-dioxo-5-*n*-butyl-2-tetrahydrothienyl)-xanthone-2-carboxylic acid, 7-(1,1-dioxo-6-*n*-butyl-2-tetrahydrothiopyranyl)-xanthone-2-carboxylic acid, 7-(1,1-dioxo-5-isobutyl-2-tetrahydrothienyl)-xanthone-2-carboxylic acid, 7-(1,1-dioxo-6-isobutyl-2-tetrahydrothiopyranyl)-xanthone-2-carboxylic acid, 7-(1,1-dioxo-5-sec-butyl-2-tetrahydrothienyl)-xanthone-2-carboxylic acid, 7-(1,1-dioxo-6-sec-butyl-2-tetrahydrothiopyranyl)-xanthone-2-carboxylic acid, 7-(1,1-dioxo-5-*t*-butyl-2-tetrahydrothienyl)-xanthone-2-carboxylic acid, 7-(1,1-dioxo-6-*t*-butyl-2-tetrahydrothiopyranyl)-xanthone-2-carboxylic acid, 7-(1,1-dioxo-5-*n*-pentyl-2-tetrahydrothienyl)-xanthone-2-carboxylic acid, and 7-(1,1-dioxo-6-*n*-pentyl-2-tetrahydrothiopyranyl)-xanthone-2-carboxylic acid.

EXAMPLE 6

1. Methyl xanthene-2-carboxylate and 4-oxobutyryl chloride are reacted together according to the procedure of Paragraph 1 of Example 1 to give methyl 7-(4-oxobutyryl)-xanthene-2-carboxylate.

2. Methyl 7-(4-oxobutyryl)-xanthene-2-carboxylate (2.4 g.) and 240 mg. of p-toluenesulfonic acid are refluxed for 16 hours in 120 ml. of toluene, water being continuously removed via a Dean-Stark separator. After cooling, the reaction mixture is washed with saturated sodium bicarbonate solution and water. The solvent is removed in vacuo and the residue recrystallized from CHCl$_3$/ethanol to give methyl 7-(2-furyl)-xanthene-2-carboxylate.

3. The above prepared compound is oxidized and then hydrolyzed as described in Paragraphs 2 and 3 of Example 2 to respectively give methyl 7-(2-furyl)-xanthone-2-carboxylate and 7-(2-furyl)-xanthone-2-carboxylic acid.

4. The foregoing procedures are repeated using (in the procedure of Paragraph 1) methyl xanthene-2-carboxylate and the compounds listed under Column C below to give, after the procedures of Paragraphs 1 to 3 above, the corresponding products listed under Column D below.

| Column C | Column D |
| --- | --- |
| 4-oxopentanoyl chloride | 7-(5-methyl-2-furyl)-xanthone-2-carboxylic acid |
| 4-oxohexanoyl chloride | 7-(5-ethyl-2-furyl)-xanthone-2-carboxylic acid |
| 4-oxoheptanoyl chloride | 7-(5-n-propyl-2-furyl)-xanthone-2-carboxylic acid |
| 4-oxo-5-methylhexanoyl chloride | 7-(5-isopropyl-2-furyl)-xanthone-2-carboxylic acid |
| 4-oxooctanoyl chloride | 7-(5-n-butyl-2-furyl)-xanthone-2-carboxylic acid |
| 4-oxo-6-methylheptanoyl chloride | 7-(5-isobutyl-2-furyl)-xanthone-2-carboxylic acid |
| 4-oxo-5-methylheptanoyl chloride | 7-(5-sec-butyl-2-furyl)-xanthone-2-carboxylic acid |
| 4-oxo-5,5-dimethylhexanoyl chloride | 7-(5-t-butyl-2-furyl)-xanthone-2-carboxylic acid |
| 4-oxononanoyl chloride | 7-(5-n-pentyl-2-furyl)-xanthone-2-carboxylic acid. |

EXAMPLE 7

1. Methyl 7-(4-oxobutyryl)-xanthene-2carboxylate (1.65 grams) and 2.5 g. of phosphorous pentasulfide are refluxed for 3½ hours in 85 ml. of benzene. The mixture is filtered hot through glass wool, the solvent evaporated and the residue recrystallized from enthanol:water to give methyl 7-(2-thienyl)-xanthene-2-carboxylate.

2. The above prepared compound is oxidized and then hydrolyzed as described in Paragraphs 2 and 3 of Example 2 to respectively give methyl 7-(2-theinyl)-xanthone-2-carboxylate and 7(2-thienyl)-xanthone-2-carboxylic acid.

3. The foregoing procedures are repeated using (in the procedure of Paragraph 1) methyl xanthene-2-carboxylate and the compounds listed under Column C of Paragraph 4 of Example 6 to give, after the procedures of Paragraphs 1 and 2 above, the following products:

7-(5-methyl-2-thienyl)-xanthone-2-carboxylic acid,
7-(5-ethyl-2-thienyl)-xanthone-2-carboxylic acid,
7-(5-n-propyl-2-thienyl)-xanthone-2-carboxylic acid, 7-(5-isopropyl-2-thienyl)-xanthone-2-carboxylic acid,
7-(5-n-2-thienyl)-xanthone-2-carboxylic acid,
7-(5-isobutyl-2-thienyl)-xanthone-2-carboxylic acid, 7-(5-sec-butyl-2-thienyl)-xanthone-2-carboxylic acid,
7-(5-t-butyl-2-thienyl)-xanthone-2-carboxylic acid, and 7-(5-n-pentyl-2-thienyl)-xanthone-2-carboxylic acid.

EXAMPLE 8

1. 2-Bromofuran (26.5 grams), dissolved in 100 ml. of dry tetrahydrofuran is added dropwise to a stirred suspension of 4.15 g. magnesium and 30 ml. of tetrahydrofuran. After the addition is completed, the mixture is refluxed for 10 minutes and cooled to give a solution of furan-2-magnesium bromide.

2. Furan-2-magnesium bromide (prepared as described above) and 33.8 g. of p-bromoanisole are refluxed in 150 ml. of tetrahydrofuran containing 30 ml. of hexamethylphosphoramide (HMPA). After cooling and diluting with water, the mixture is extracted with ether and the product distilled in vacuo to give 2-(p-methoxyphenyl)-furan.

3. 2-(p-Methoxyphenyl)-furan (22 g.) and pyridine hydrochloride are stirred at 210°C for 6 hours. The mixture is cooled, diluted with water and extracted with either to give 2-(p-hydroxyphenyl)-furan.

4. A mixture of 4.3 g. of 1,3-dicarbomethoxy-4-bromobenzene, 3.6 g. of 2-(p-hydroxyphenyl)-furan, 1.1 g. of cuprous oxide, and 25 ml. of tetramethylurea is heated to 165° C and maintained thereat with stirring for 18 hours under a nitrogen atmosphere. After this time, the reaction mixture is diluted with water and extracted with ether. The extracts are dried and evaporated to give 1,3-dicarbomethoxy-4-(p-(2-furyl)-phenyloxy-)-benzene.

5. 1,3-Dicarbomethoxy-4-(p-(2-furyl)-phenyloxy)-benzene (2.76 g.) is dissolved in 50 ml. of ethanol and the mixture is refluxed for 30 minutes, concentrated under reduced pressure, and acidified with dilute hydrochloric acid. The solid collected upon filtration is washed with water and dried to give 1,3-dicarboxy-4-(p-(2-furyl)-phenyloxy)-benzene which is recrystalized from ethanol: water.

6. A solution of 2.7 g. of 1,3-dicarboxy-4-(p-(2-furyl)-phenyloxy)-benzene in 30 ml. of concentrated sulfuric acid is warmed to 80° C. The mixture is then allowed to stand at room temperature for 16 hours after which time it is poured into ice water, filtered, washed and dried to give 7-(2-furyl)-xanthone-2-carboxylic acid which is recrystallized from tetrahydrofuran:ethanol.

The foregoing method can also be employed using an alternative 1,3-carboloweralkoxy-4-halo starting compound such as 1,3-dicarbomethoxy-4-chloro or iodo benzene, 1,3-dicarboethoxy-4-fluoro benzene, 1,3-dicarboethoxy-4-bromo benzene, and the like, with similar results.

7. 7-(2-Thienyl)-xanthone-2-carboxylic acid is prepared using the procedures of Paragraphs 1 to 6 above employing 2-bromothiophene in lieu of 2-bromofuran in the procedure of Paragraph 1 thereof.

8. The following compounds are prepared by employing the above procedures of Paragraphs 1 to 6 upon the corresponding 5-alkyl substituted-2-bromofurans and -thiophenes:

7-(5-methyl-2-furyl)-xanthone-2-carboxylic acid,
7-(5-methyl-2-thienyl)-xanthone-2-carboxylic acid,
7-(5-ethyl-2-furyl)-xanthone-2-carboxylic acid,
7(5-ethyl-2-thienyl)-xanthone-2-carboxylic acid,
7-(5-n-propyl-2-furyl)-xanthone-2-carboxylic acid,
7-(5-n-propyl-2-thienyl)-xanthone-2-carboxylic acid, 7-(5-isopropyl-2-furyl)-xanthone-2-carboxylic acid,
7-(5-isopropyl-2-thienyl)-xanthone-2-carboxylic acid,
7-(5-n-butyl-2-furyl)-xanthone-2-carboxylic acid,
7-(5-n-butyl-2-thienyl)-xanthone-2-carboxylic acid,
7-(5-isobutyl-2-furyl)-xanthone-2-carboxylic acid,
7-(5-isobutyl-2-thienyl)-xanthone-2-carboxylic acid, 7-(5-sec-butyl-2-furyl)-xanthone-2-carboxylic acid,
7-(5-sec-butyl-2-thienyl)-xanthone-2-carboxylic acid,
7-(5-t-butyl-2-furyl)-xanthone-2-carboxylic acid,
7-(5-t-butyl-2-thienyl)-xanthone-2-carboxylic acid,
7-(5-n-pentyl-2-furyl)-xanthone-2-carboxylic acid, and 7-(5-n-pentyl-2-thienyl)-xanthone-2-carboxylic acid.

EXAMPLE 8

1. 22 grams of aluminum chloride are added portionwise at 0° C to a stirred solution of 12.7 g. of methyl xanthene-2-carboxylate in 350 ml. of dichloroethane. Thereafter, 5.0 g. of succinic anhydride are added and the mixture is stirred at room temperature for 4 hours. After pouring the mixture into ice/HCl, it is extracted with chloroform and the crude product recrystallized from ethyl acetate to give methyl 7(-3-carboxypropionyl)-xanthene-2-carboxylate.

To a solution of 2.35 g. of methyl 7-(3-carboxypropionyl)-xanthene-2-carboxylate in 80 ml. of ethanol and 20 ml. of water containing 600 mg. of sodium bicarbonate are added 500 mg. of sodium borohydride. After stirring for 45 minutes at room temperature, the solution is acidified with dilute hydrochloric acid and concentrated in vacuo to give methyl 7-(5-oxo-2-tetrahydrofuryl)-xanthene-2-carboxylate.

3. 7-(3-Carboxypropionyl)-xanthene-2-carboxylic acid is prepared by hydrolysis (see Example 2, Paragraph 3) of the methyl ester of Paragraph 1 of this Example.

4. 7-(3-Carboxypropionyl)-xanthene-2-carboxylic acid (1.8 g.) is stirred at 0° C for 2 hours in a solution of 1 ml. of perchloric acid in 30 ml. of acetic anhydride. After this period of time, water is added slowly. The precipitate is isolated by suction filtration and recrystallized from ethyl acetate to give 7-(5-oxo-4H-2-furyl)-xanthene-2-carboxylic acid.

5. The products of the procedures of Paragraphs 2 and 4 hereof are oxidized and then hydrolyzed, if necessary, as described in Paragraphs 2 and 3 of Example 2, to respectively give methyl 7-(5-oxo-2-tetrahydrofuranyl)-xanthone-2-carboxylate and then 7-(5-oxo-2-tetrahydrofuranyl)-xanthone-2-carboxylic acid and 7-(5-oxo-4H-2-furyl)-xanthone-2-carboxylic acid.

6. 7-(5-Oxo-4H-2-furyl)-xanthone-2-carboxylic acid (3.22 g.) is treated with 1.5 g. of sodium methoxide in 60 ml. of dimethylsulfoxide at room temperature for 2 hours. After this time, the reaction mixture is acidified with dilute HCl to give 7-(5-oxo-2H-2-furyl)-xanthone-2-carboxylic acid.

EXAMPLE 9

A mixture of 4.5 grams of 7-(2-tetrahydrofuryl)-xanthone-2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl 7-(2-tetrahydrofuryl)-xanthone-2-carboxylate.

The foregoing procedure is repeated using the alternate lower alkyl iodides so as to prepare the corresponding lower alkyl acid esters hereof, e.g.:
ethyl 7-(2-tetrahydrofuryl)-xanthone-2-carboxylate,
n-propyl 7-(2-tetrahydrofuryl)-xanthone-2-carboxylate,
isopropyl 7-(2-tetrahydrofuryl)-xanthone-2-carboxylate,
n-propyl 7-(2-tetrahydrofuryl)-xanthone-2-carboxylate,
isobutyl 7-(2-tetrahydrofuryl)-xanthone-2-carboxylate,
sec-butyl 7-(2-tetrahydrofuryl)-xanthone-2-carboxylate,
n-pentyl 7-(2-tetrahydrofuryl)-xanthone-2-carboxylate, and so forth.

In like manner, the other xanthone-2-carboxylic acids thereof containing substituents at the C-7 position, prepared as described above, can be converted to the corresponding acid esters, e.g. methyl 7-(2-tetrahydrothienyl)-xanthone-2-carboxylate, ethyl 7-(2-tetrahydrothienyl)-xanthone-2-carboxylate.

EXAMPLE 10

To a solution of 10 grams of 7-(2-furyl)-xanthone-2-carboxylic acid in 200 ml. of ethanol is added the theoretical amount of sodium hydroxide dissolved in 200 ml. of 90 percent ethanol. The reaction mixture is then concentrated in vacuum to give sodium 7-(2-furyl)-xanthone-2-carboxylate.

Sodium 7-(2-tetrahydrofuryl)-xanthone-2-carboxylic and sodium 7-(2-tetrahydrothienyl)-xanthone-2-carboxylate are also thus prepared.

In a similar manner, the potassium and lithium salts are prepared. Similarly, by replacing the sodium salt by means of an appropriate metal salt reagent, e.g. calcium chloride, manganese chloride, and so forth, the other xanthone-2-carboxylic acid salts are prepared, e.g.:
magnesium 7-(2-furyl)-xanthone-2-carboxylate,
calcium 7-(2-furyl)-xanthone-2-carboxylate,
aluminum 7-(2-furyl)-xanthone-2-carboxylate,
ferrous 7-(2-furyl)-xanthone-2-carboxylate,
zinc 7-(2-furyl)-xanthone-2-carboxylate,
manganese 7-(2-furyl)-xanthone-2-carboxylate,
ferric 7-(2-furyl)-xanthone-2-carboxylate, and so forth.

In a similar manner, the xanthone-2-carboxylic acid salts of the other C-7 substituted xanthone-2-carboxylic acids hereof are prepared.

EXAMPLE 11

To a mixture of 50 milliliters of concentrated aqueous ammonia in 500 ml. of methanol there are added 20 g. of 7-(5-oxo-2-tetrahydrofuryl)-xanthone-2-carboxylic acid. The resultant mixture is stirred for 2 hours and is then evaporated to dryness to give the ammonium salt of 7-(5-oxo-2-tetrahydrofuryl)-xanthone-2-carboxylic acid.

A solution of 10 g. of 7-(2-thienyl)-xanthone-2-carboxylic acid in 50 ml. of thionyl chloride is heated at reflux for 1 hour. Thereafter, the solution is evaporated to dryness to give the corresponding acid chloride to which is added a concentrated ethereal ammonia solution. The resultant solution is evaporated giving the ammonium salt of 7-(2-thienyl)-xanthone-2-carboxylic acid.

In like manner the lower alkyl amides can be prepared using monoalkylamine or dialkylamine in lieu of ammonia in the above procedures. Thus prepared, e.g. are:
7-(2-tetrahydropyranyl)-xanthone-2-carboxylic acid amide,
N-methyl 7-(1-oxo-2-tetrahydrothiopyranyl)-xanthone-2-carboxylic acid amide,
N,N-dimethyl 7-(1,1-dioxo-2-tetrahydrothienyl)-xanthone-2-carboxylic acid amide,
N,N-diethyl 7-(2-tetrahydrofuryl)-xanthone-2-carboxylic acid amide,
N-ethyl 7-(2-tetrahydrothienyl)-xanthone-2-carboxylic acid amide,
N-n-propyl 7-(5-oxo-4H-2-furyl)-xanthone-2-carboxylic acid amide, and so forth.

EXAMPLE 12

To a mixture of 20 grams of procaine and 500 ml. of aqueous methanol are added 20 g. of 7-(2-furyl)-xanthone-2-carboxylic acid. The resultant mixture is stirred at room temperature for 16 hours. It is then evaporated under reduced pressure, to give the procaine salt of 7-(2-furyl)-xanthone-2-carboxylic acid.

Similarly, the lysine, caffeine, and arginine salts thereof are obtained. In like manner, the e.g. procaine, lysine, caffeine, and arginine salts of the other 7-substituted xanthone-2-carboxylic acids are obtained, e.g.:

the procaine salt of 7-(5-methyl-2-tetrahydrofuryl)-xanthone-2-carboxylic acid, the caffeine salt of 7-(6-ethyl-2-tetrahydropyranyl)-xanthone-2-carboxylic acid, the lysine salt of 7-(5-methyl-2-furyl)-xanthone-2-carboxylic acid, the procaine salt of 7-(5-propyl-2-tetrahydrothienyl)-xanthone-2-carboxylic acid, and the arginine salt of 7-(6-ethyl-2-thienyl)-xanthone-2-carboxylic acid.

EXAMPLE 13

The following illustrate the method by which the pharmaceutical compositions of the compounds hereof are prepared.

Sodium chloride (0.44 g.) is dissolved in 80 ml. of a (9.47 g/l. water) sodium hydrogen phosphate solution. A sodium dihydrogen phosphate (8.00 g/l. water) solution (20 ml.) is then added thereto. The resultant solution having a pH of 7.38 is sterilized in an autoclave. This vehicle is then added to solid, dry sodium 7-(2-furyl)-xanthone-2-carboxylate to give a preparation suitable for intravenous injection containing 2.5 mg. of sodium 7(2-furyl)-xanthone-2-carboxylate per milliliter of total composition.

7-(2-Tetrahydrothienyl)-xanthone-2-carboxylic acid is dissolved in a vehicle having a composition ranging from propylene glycol:water of 10:90 (w/w) to propylene glycol: water of 50:50 (w/w) to give an aerosol preparation suitable for inhalation.

Sodium 7-(2-thienyl)-xanthone-2-carboxylic acid (1 part) is mixed with from 1 to 10 parts (by weight) of lactose or urea to give a powder preparation suitable for administration by nebulization.

Tablet preparations suitable for oral administration are prepared by mixing the following ingredients in the indicated proportions:

| Component | Percent, by Weight |
|---|---|
| a xanthone-2-carboxylic acid compound hereof | 0.5 – 70 |
| polyvinylpyrrolidone | 0.5 – 10 |
| starch | 10 – 25 |
| lactose | 20 – 75 |
| magnesium stearate | 0.1 – 1 |
| granulating fluids (e.g. aqueous methanol, water, chloroform) | |

EXAMPLE 14

Illustrative test procedures for the compounds hereof are as follows:

Normal female (Sprague-Dawley) rats of 140 to 160 grams each are passively sensitized intradermally by injection of rat anti-egg albumin reaginic sera. After 24 hours, each rat is challenged intravenously with 1.75 ml. of 0.4 percent Evans blue, 1 mg. egg albumin plus 0.125 mg. of 7-(2-tetrahydrofuryl)-xanthone-2-carboxylic acid. Control rats receive no xanthone-2-carboxylic acid. The dermal bluing is recorded 15 to 25 minutes later. The rats which receive the 7-(2-tetrahydrofuryl)-xanthone-2-carboxylic acid exhibit a 100 percent inhibition of allergic reaction whereas the control rats exhibit no inhibition.

The above procedure is repeated using 7-(2-tetrahydrothienyl)-xanthone-2-carboxylic acid, with similar results. The above procedure is repeated using oral administration, with similar results.

EXAMPLE 15

A dosage of 100 mg. per kg. of body weight of 7-(2-tetrahydrothienyl)-xanthone-2-carboxylic acid is given intraperitoneally to guinea pigs. Other pigs are left untreated to serve as controls. After treatment, the treated pigs and the controls are exposed to an aqueous spray of 0.05 percent histamine diphosphate (calc. as base), delivered by a nebulizer, until they exhibit a loss of righting ability. During exposure they are observed for severity of reaction. This ranges from slightly deeper breathing to deep breathing to preconvulsive gasping and ataxia to collapse. The pigs which receive the 7-(2-tetrahydrothienyl)-xanthone-2-carboxylic acid exhibit a significant resistance to the histamine aerosol challenge, whereas all control pigs collapse within the exposure time.

The above procedure is repeated using 7-(2-tetrahydrofuryl)-isopropoxyxanthone-2-carboxylic acid with similar results.

The trachea of a recently sacrificed guinea pig is removed by dissection and cut between the segments of cartilege into rings containing tracheal muscle which are tied to form a 180° alternating smooth muscle tracheal chain. The thus produced continuous length of smooth muscle is mounted in a tissue bath maintained at 37° C with the upper end attached to a linear motion transducer which in turn is connected to a recorder. The responses of a standard, aminophylline, and 7-(2-tetrahydrofuryl)-xanthone-2-carboxylic acid are compared after introducing each separately into the bath in various amounts or concentrations. The results show a significant relaxation of the tracheal chain with the test compound.

Inhibition of reaginic antigen-antibody reactions in rats is regarded as representative of inhibition of human reaginic antigen-antibody reactions which occur during allergic episodes. Protection against histamine aerosol induced bronchoconstriction and relaxation of isolated tracheal chain is regarded as representative of human bronchopulmonary activity including bronchodilator activity. Subjects suffering from bronchopulmonary disorders are studied as to severity of bronchospasm and changes in severity by observeable and measurable changes in expiratory function. Such measurements include quantitation of expiratory pulmonary air flow, measureable by such instruments as a peak flow meter, and comparison of pulmonary volumes before and after treatment with the subject compounds hereof, as measured by spirometric and/or plethysmographic methods. Subjective relief of the symptoms upon administration of the compounds hereof is evidenced by improvements in dyspnea, wheezing, cough and expectorated sputum.

What is claimed is:

1. A compound selected from those represented by the following formulas:

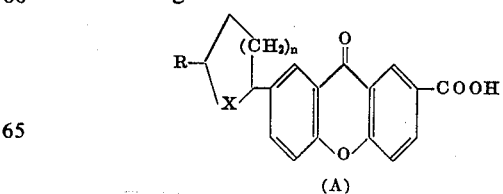

(A)

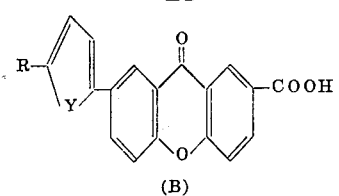

(B)

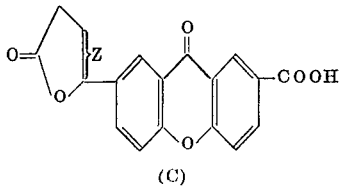

(C)

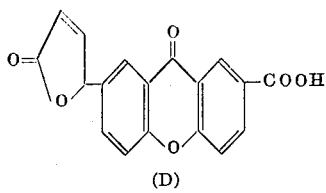

(D)

and the pharmaceutically acceptable, non-toxic lower alkyl or glycerol esters, unsubstituted, mono-lower alkyl, di-lower alkyl or phenethyl substituted amides and salts thereof, wherein each R is hydrogen or lower alkyl; X is oxy, thio, sulfinyl, or sulfonyl; $n$ is 1 or 2 Y is oxy or thio; and Z is a carbon-carbon single or double bond.

2. A compound according to claim 1 of Formula (A).

3. A compound according to claim 2 wherein R is methyl.

4. A compound according to claim 2 wherein R is hydrogen.

5. A compound according to claim 4 wherein $n$ is 2.

6. A compound according to claim 4 wherein $n$ is 1.

7. A compound according to claim 6 wherein X is oxy.

8. A compound according to claim 6 wherein X is thio.

9. A compound according to claim 1 of Formula (B).

10. A compound according to claim 9 wherein R is methyl.

11. A compound according to claim 9 wherein R is hydrogen.

12. A compound according to claim 11 wherein Y is oxy.

13. A compound according to claim 11 wherein Y is thio.

14. A compound according to claim 1 of Formula (C).

15. A compound according to claim 1 of Formula (D).

16. The compound according to claim 1 which is 7-(2-tetrahydrofuryl)-xanthone-2-carboxylic acid.

17. The compound according to claim 1 which is 7-(2-tetrahydrothienyl)-xanthone-2-carboxylic acid.

18. The sodium salt of the compounds according to claim 1.

19. The salt according to claim 18 of Formula (A).

* * * * *